(12) United States Patent
McFarthing et al.

(10) Patent No.: US 11,894,885 B2
(45) Date of Patent: Feb. 6, 2024

(54) NEAR ULTRA LOW ENERGY FIELD TRANSDUCER DESIGN

(71) Applicant: QUALCOMM Incorporated, San Diego, CA (US)

(72) Inventors: Anthony McFarthing, Ely (GB); Jimmy Andreas Johansson, London (GB)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/750,956

(22) Filed: May 23, 2022

(65) Prior Publication Data

US 2023/0379006 A1 Nov. 23, 2023

(51) Int. Cl.
*H01Q 13/10* (2006.01)
*H04B 5/00* (2006.01)
*H04B 7/00* (2006.01)
*H04B 1/40* (2015.01)
*H04B 5/02* (2006.01)

(52) U.S. Cl.
CPC ............ *H04B 5/0081* (2013.01); *H04B 1/40* (2013.01); *H04B 5/02* (2013.01)

(58) Field of Classification Search
None
See application file for complete search history.

(56) References Cited

U.S. PATENT DOCUMENTS

| | | | | |
|---|---|---|---|---|
| 7,679,571 B2* | 3/2010 | Inaba | ...................... | H01Q 7/08 343/713 |
| 7,850,086 B2* | 12/2010 | Nakane | .............. | G06K 19/0707 235/492 |
| 7,853,208 B2* | 12/2010 | Washiro | ............... | H04B 5/0018 343/743 |
| 7,869,337 B2* | 1/2011 | Ishibashi | .............. | G06Q 20/123 455/575.1 |
| 8,224,244 B2* | 7/2012 | Kim | ..................... | H04B 13/005 455/100 |
| 8,862,191 B2* | 10/2014 | Ohishi | ................... | H01Q 1/273 455/575.5 |

(Continued)

OTHER PUBLICATIONS

International Search Report and Written Opinion—PCT/US2023/021516—ISA/EPO—dated Aug. 14, 2023.

*Primary Examiner* — Tuan A Tran
(74) *Attorney, Agent, or Firm* — Holland & Hart LLP

(57) ABSTRACT

Methods, systems, and devices for an apparatus that performs near field communications are described. A near ultra low energy field (NULEF) system may be used in systems that come in close contact with the human body. NULEF-E may experience limited performance due to external electric fields generated by a human body. NULEF-E may also be used across other bodies having electrically conductive or semi-conductive surfaces. The interference of the external electric fields may be mitigated by increasing the electrical length between a transducer and an electrode of the system. In particular, a wire electrically connecting a transceiver and a electrode may have a wire length that is also an electrical length between the transceiver and the electrode, the wire being configured such that a physical distance between the electrode and the transceiver is less than the wire length while maintaining the electrical length.

24 Claims, 7 Drawing Sheets

(56) References Cited

U.S. PATENT DOCUMENTS

| | | | |
|---|---|---|---|
| 10,075,021 B2* | 9/2018 | Kusunoki | H04B 5/0037 |
| 10,396,464 B2* | 8/2019 | Matsushita | H01Q 13/10 |
| 11,108,437 B1* | 8/2021 | Kerselaers | H04B 5/0012 |
| 2008/0119135 A1 | 5/2008 | Washiro | |
| 2009/0273418 A1 | 11/2009 | Shimizu et al. | |
| 2010/0054305 A1* | 3/2010 | Hammerschmidt | B60R 21/01532 375/E1.001 |
| 2014/0213184 A1* | 7/2014 | Matsubara | H04B 5/0031 455/41.1 |
| 2015/0333538 A1* | 11/2015 | Kusunoki | H02J 50/12 307/104 |
| 2017/0054219 A1* | 2/2017 | Matsushita | H01Q 13/10 |
| 2019/0044694 A1* | 2/2019 | Raj | H04W 52/00 |
| 2019/0052371 A1* | 2/2019 | Uno | H04B 13/005 |

* cited by examiner

NEAR ULTRA LOW ENERGY FIELD TRANSDUCER DESIGN

FIELD OF TECHNOLOGY

The following relates to an apparatus for performing near field communications, including near ultra low energy field (NULEF) transducer design.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support near ultra low energy field (NULEF) transducer design. For example, the described techniques provide for a design method for electrodes in a NULEF-E transducer system to maximize the received signal levels. The '-E' in NULEF-E stands for electric field strength symbol in international system of units (SI) denoting electric NULEF mode as opposed to NULEF-H, where the H refers to magnetic field strength or magnetic NULEF-mode. Aspects of the present disclosure depicts a design related to NULEF-E. The apparatus may include an electrode, a transceiver and a wire electrically connecting the transceiver and the electrode. In some examples, the wire may have a wire length that is also an electrical length between the transceiver and the electrode, the wire being configured such that a physical distance between the electrode and the transceiver is less than the wire length while maintaining the electrical length.

A method is described. The method may include an electrode, a transceiver, and a wire electrically connecting the transceiver and the electrode, the wire having a wire length that is also an electrical length between the transceiver and the electrode, the wire being configured such that a physical distance between the electrode and the transceiver is less than the wire length while maintaining the electrical length.

An apparatus is described. The apparatus may include a processor, memory coupled with the processor, and instructions stored in the memory. The instructions may be executable by the processor to cause the apparatus to an electrode, a transceiver, and a wire electrically connect the transceiver and the electrode, the wire having a wire length that is also an electrical length between the transceiver and the electrode, the wire being configured such that a physical distance between the electrode and the transceiver is less than the wire length while maintaining the electrical length.

Another apparatus is described. The apparatus may include means for an electrode, means for a transceiver, and means for a wire electrically connecting the transceiver and the electrode, the wire having a wire length that is also an electrical length between the transceiver and the electrode, the wire being configured such that a physical distance between the electrode and the transceiver is less than the wire length while maintaining the electrical length.

A non-transitory computer-readable medium storing code is described. The code may include instructions executable by a processor to an electrode, a transceiver, and a wire electrically connect the transceiver and the electrode, the wire having a wire length that is also an electrical length between the transceiver and the electrode, the wire being configured such that a physical distance between the electrode and the transceiver is less than the wire length while maintaining the electrical length.

In some examples of the method, apparatuses, and non-transitory computer-readable medium described herein, the wire may be connected between the transceiver and the electrode using a set of multiple turns in accordance with an orientation pattern that maintains the electrical length.

In some examples of the method, apparatuses, and non-transitory computer-readable medium described herein, the orientation pattern includes the wire being wound in a clockwise orientation during a first turn of the set of multiple turns followed by a counter-clockwise orientation during a second turn of the set of multiple turns.

In some examples of the method, apparatuses, and non-transitory computer-readable medium described herein, the first turn of the set of multiple turns and the second turn of the set of multiple turns may be consecutive turns.

In some examples of the method, apparatuses, and non-transitory computer-readable medium described herein, each turn of the set of multiple turns includes the wire being wound in a spiral.

In some examples of the method, apparatuses, and non-transitory computer-readable medium described herein, the conductive shield includes a cylindrical shield and a length of the cylindrical shield covers the electrode.

In some examples of the method, apparatuses, and non-transitory computer-readable medium described herein, the conductive shield includes a cylindrical shield and a length of the cylindrical shield covers the electrode and at least a portion of the wire electrically connecting the transceiver and the electrode.

In some examples of the method, apparatuses, and non-transitory computer-readable medium described herein, the conductive shield includes a metal shield. In some examples of the method, apparatuses, and non-transitory computer-readable medium described herein, the electrical length of wire may be selected based on a desired range of difference in potential at the transceiver.

In some examples of the method, apparatuses, and non-transitory computer-readable medium described herein, the electrode may be capacitively coupled to a human body. In some examples of the method, apparatuses, and non-transitory computer-readable medium described herein, the electrode may be directly coupled to a human body.

DETAILED DESCRIPTION

In some wireless communication systems, devices may communicate using magnetic communication. Magnetic communications may be achieved via modulated magnetic fields that effectively penetrate many solid objects, including the human body. In some cases it may be beneficial for a short-range device to communicate using magnetic communication technology rather than communicating over radio frequency (RF) airways such as to reduce interference and congestion in RF airways.

Communications are usually accomplished in using transverse electromagnetic waves. NULEF-E, however, has been deigned to transfer signals across electrically conductive materials include the human body, which may be a primary application of NULEF-E. Thus, it is a modulated E-field on the surface of a conductive material that allows a wireless transfer of information.

In some cases, a NULEF system may experience limited performance due to external electric fields. For example, a NULEF system may be used in an ear bud which may be in close proximity to a human body. The electric fields on the body may interfere with the electric fields produced by the electrodes on the NULEF system and affect the received signal level of the system. In some cases, the received signal level may be improved by increasing the length of the leads (e.g., wires) that connect a transceiver of the system to an electrode. However, physical constraints of the system may limit the practical length of the lead. In some cases, the length of the leads between the electrode and a transceiver or receiver of the system may be preserved or otherwise increased by folding the leads. However, such folding may also lead to parasitic capacitance which may shorten the electrical length of the leads.

The method, techniques, and apparatuses described herein may provide design details of the electrodes of a NULEF system to maximize the received signal levels. Although the design details may be described in the context of electrodes in an earbud, the design principles may apply equally to any electrode transceiver applied to the human skin. Accordingly, the leads of a NULEF system which connect a transceiver to an electrode may be coiled in a spiral shape in order to increase the number of turns in the wire as much as physical space constraints allow until parasitic inductance or capacitance starts to diminish. As such, the signal level at the receiver of the system may be maximized using such an apparatus. Additionally, such apparatus may provide for shielding of an electrode of the system from external electric fields, which may also increase the received signal level.

Aspects of the disclosure are initially described in the context of wireless communications systems. Aspects of the disclosure are further illustrated by and described with reference to apparatus diagrams, system diagrams, and flowcharts that relate to the NULEF-E transducer design.

Figure 1:
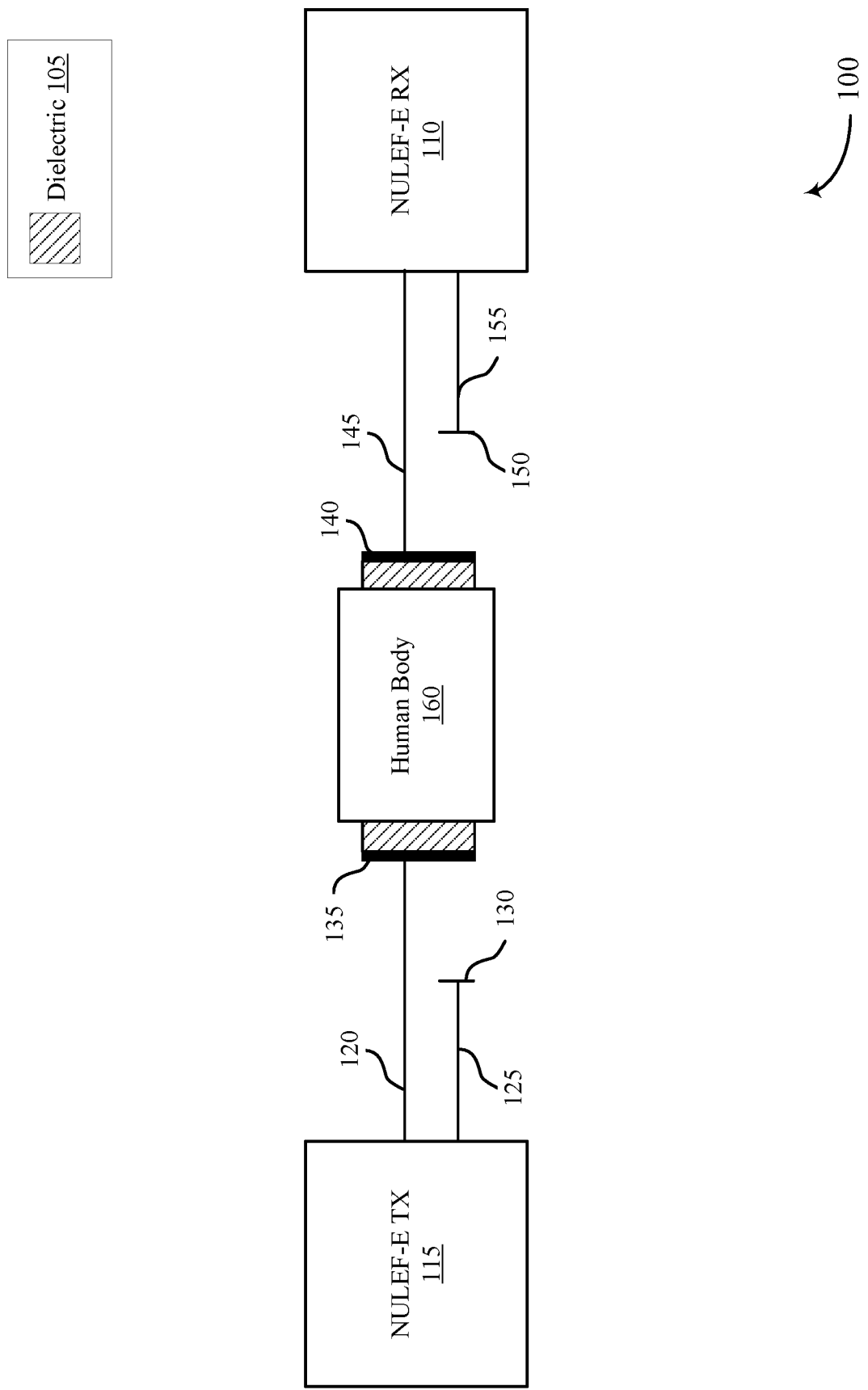
FIG. 1 illustrates an example of an electrical setup for a near ultra low energy field (NULEF) transceiver that supports the NULEF-E transducer design in accordance with one or more aspects of the present disclosure.

FIG. 1 illustrates an example of an electrical setup 100 that supports the NULEF-E transducer design in accordance with one or more aspects of the present disclosure. A NULEF system may communicate data between a NULEF transmitter 115 and a NULEF receiver 110 via means of electric field coupling. For example, in some NULEF communication systems, the antennas used in the transmitter 115 and receiver 110 may be symmetrical such that the performance of the transceiver is not compromised when switching between transmit and receive modes.

The transmitter 115 may be connected to a primary electrode 135 and a secondary electrode 130. The lead 120 between the transmitter 115 and the primary electrode 135 may have a positive voltage and the lead 125 between the transmitter 115 and the secondary electrode 130 may have a negative voltage. The receiver 110 may be connected to a primary electrode 140 and a secondary electrode 150. The lead 145 between the receiver 110 and the primary electrode may have a negative voltage and the lead 155 between the receiver 110 and the secondary electrode 150 may have a positive voltage. The receiver 110 may also include a transducer which converts an electric field to a voltage.

In some implementations the link between the transmitter 115 and the receiver 110 may be from one ear to another ear (e.g., ear buds) and thus the transmitter 115 may be in one ear the receiver 110 may be in the other ear. As such, the human body 160 may be a transmission medium. In some implementations, the primary electrodes 135 and 140 may be capacitively coupled to the human body 160 via a dielectric 105. In other implementations, the primary electrodes 135 and 140 may be directly coupled to the human body 160. The body 160 may respond to an input (e.g., voltage on transmitter 115) by having a charge distribution across it which produces an electric field on the human body 160. The secondary electrode 150 may sense the electric field being produced on the human body 160 which may cause the secondary electrode 150 to produce a differential voltage at the receiver input. Accordingly, the input voltage may be treated as an input signal and processed as such.

In some cases, electromagnetic or other electric fields external to a NULEF system may interfere with performance of the system. For example, a NULEF system may be used in an earbud that come into contact with a human body. The conductive properties of the body may be approximated as a wire in that an electromagnetic field may drive charge onto the skin that produces an electric field on the body. In other words, at some instants of time there may be either a negative charge or positive charge on the body which generates an electric field. In a NULEF system, received signal levels may be dependent on the length of the leads connecting the transceiver of a NULEF system to the electrodes of the system according to a derivation of Gauss' Law. The potential difference between two points A and B may be demonstrated with Gauss' Law and VA and VB may depend on the electric fields at those two locations where s is the distance as shown in equation 1.

$$V_A - V_B = \int_A^B E(s)\,ds$$

In some cases, there may be an electric field at one point on a human body due to a NULEF transmitter being switched on at another point on the human body. For either direct or indirect electrodes, the primary electrode may have the same electric field and therefore the same concentration of charge carriers as the skin of the human body. The secondary electrode may be partially or preferable fully shielded from the electric field of the skin. There may be an opposite electric field induced at the secondary electrode due to the electric field at the primary electrode. From equation 1, it can be seen that the voltage difference depends on the magnitude of E but also the distance between the electrodes which is a function of s. In some cases, the interference caused by the electric fields produced on the skin may be overcome by increasing the length of the wire between the receiver or transmitter and the electrodes. However, for some applications the length of the wire if stretched out may be impractical.

In some cases, the leads (or wire) between a receiver or transmitter and a primary or secondary electrode may be increased by efficiently coiling the leads. In some implementations, the leads may be folded in an alternating clockwise and counterclockwise manner. In other implementations, the leads may be coiled in alternating spirals. In some cases, a shield may be implemented to protect the electrode from external electric fields. As such, the electrical length of the leads may be increased which may increase the received signal level.

Figure 2:
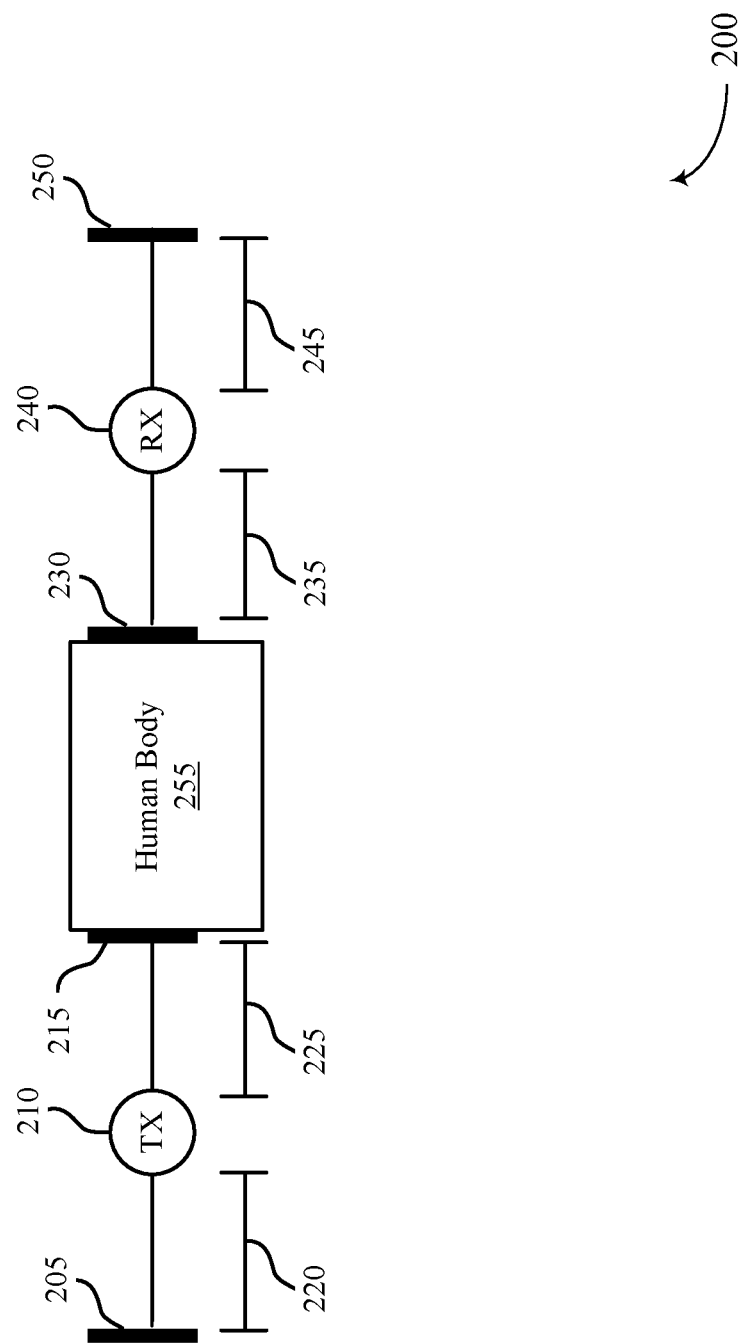
FIG. 2 illustrates an example of a physical setup of a NULEF transceiver that supports the NULEF-E transducer design in accordance with one or more aspects of the present disclosure.

FIG. 2 illustrates an example of a physical setup 200 that supports the NULEF-E transducer design in accordance with one or more aspects of the present disclosure. illustrates a physical setup of a NULEF system with distance between electrodes and transmitter and receiver. Setup 200 may be an example of set up 100 as described with reference to FIG. 1. In setup 200, a differential receiver may be at the input to produce a differential input signal/voltage at the receiver 240. A primary electrode 230 may be located on one input to the receiver 240 and a secondary electrode 250 may be located on the other input to the receiver 240. Thus, there may be electrode on both sides of the differential inputs of the receiver. Similarly, the transmitter 210 may be separated from a primary electrode 205 by a distance 220 and from a secondary electrode 215 by a distance 225. The distance 220 may be referred to as the TXS distance and the distance 225 may be referred to as the TXP distance.

In some cases, the receiver 240 may experiences sensitivity to various external factors. For example, the size of the primary electrode 230 and the secondary electrode 250 may affect the overall performance of the system. Additionally or alternatively, the distance 235 and the distance 245 between the electrodes and the receiver 240 may also affect performance. The distance 235 between the primary electrode 230 and the receiver 240 may be referred to as the RXP distance. Similarly, the distance 245 between the secondary electrode 250 and the receiver 240 may be referred to as the RXS distance. In some cases, the level of the receiver input for a given electric field on the body 255 may be proportional to RXP+RXS. As the distance between the primary and secondary nodes (RXS+RXP) increase, the effective gain (e.g., S21) between the transmitter 210 and receiver 240 changes. The gain may refer to the ratio of the receive signal level to the transmit signal level. Thus, the received signal level may increase proportionately in order to increase the distance between nodes and it may be desirable to maintain a long electrical length in the receiver 240.

Figure 3:
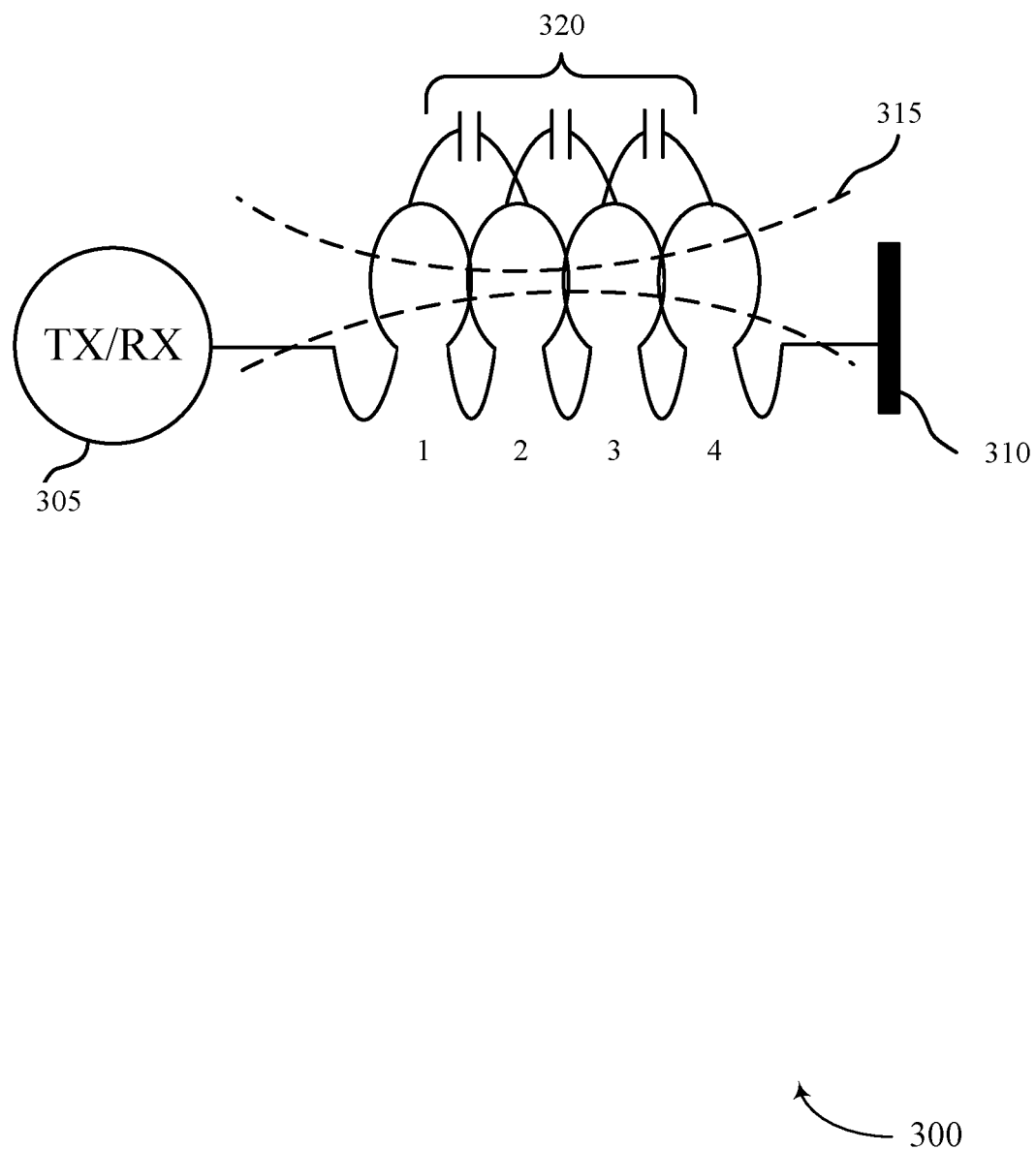
FIG. 3 illustrates an example of a wire configuration that supports the NULEF-E transducer design in accordance with one or more aspects of the present disclosure.

FIG. 3 illustrates an example of a wire configuration 300 that supports the NULEF-E transducer design in accordance with one or more aspects of the present disclosure. illustrates one configuration for coiling the leads between nodes. As shown in FIG. 3, the wire between the transmitter or receiver 305 and the secondary electrode 310 may be coiled in multiple turns with an orientation that maintains the electrical length. The orientation pattern may include the wire being wound in a clockwise direction during a first turn followed by a counter-clockwise orientation during a second turn.

The wire configuration 300 may experience parasitic electric and magnetic components. In the wire configuration 300, the electrical length is the length of the coiled wire. The wire configuration 300 may result in a parasitic inductance 315 between the turns of the wound device. As such, the signal may short circuit the full length of the wire thus reducing the length that the signal travels through. In other words, the electrical length may be shortened through inductive coupling, where one turn of the wire communicates with another. In some cases, reversing the direction of turns as shown in FIG. 3 may decrease inductive coupling. This may be useful at high operating frequencies.

In some cases, parasitic capacitance 320 may be generated between the turns due to the wires being close which may shorten the electrical length. As such, the wanted signal may jump or short circuit. Thus, in some cases the wire configuration 300 may result in a reduced received signal level because of capacitive and inductive effects.

In some cases, the main reduction to electrical length may be cause by parasitic capacitance rather than parasitic inductance. Transducer efficiency (e.g., gain) may be maximized by increasing the turns of the wire as much as physical constraints allow until the parasitic inductance 315 and parasitic capacitance 320 starts to diminish the efficiency. In some cases, increasing the dielectric constant from that of air within a physical container (e.g., earbud housing) may provide some improvement of gain. However, in some cases the increased dielectric constant may also increase parasitic effects and thus there may not be an increase in gain. Additionally or alternatively, the configuration shown in 300 may be an inexpensive way to improve system performance.

Figure 4:
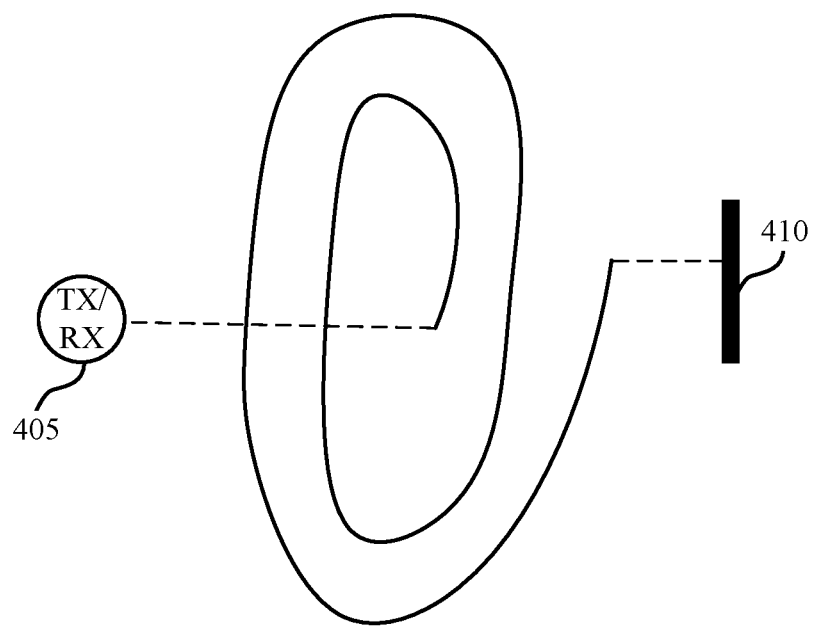
FIG. 4 illustrates an example of a wire configuration that supports the NULEF-E transducer design in accordance with one or more aspects of the present disclosure.

FIG. 4 illustrates an example of a spiral wire configuration 400 that supports the NULEF-E transducer design in accordance with one or more aspects of the present disclosure. illustrates another method of configuration for maximizing the electrical length between nodes while also minimizing parasitic inductance and capacitance. As shown in FIG. 4, the electrical length between a transmitter or receiver 405 and an electrode 410 may be increased by using a spiral per coil turn. Accordingly, each turn of a coil or solenoid structure shown in FIG. 3 may be replaced by the spiral wire configuration 400 thus increasing the wire length. In this way, the distance between the turns may be preserved as wide as possible to decrease the parasitic capacitance. Additionally or alternatively, the cross sectional area of the wire may be kept relatively thin. Thus, by winding the wire in one direction and then winding the wire in the other direction inductive coupling may be eliminated and by using a spiral the area inside the loop may be effectively utilized.

Figure 5:
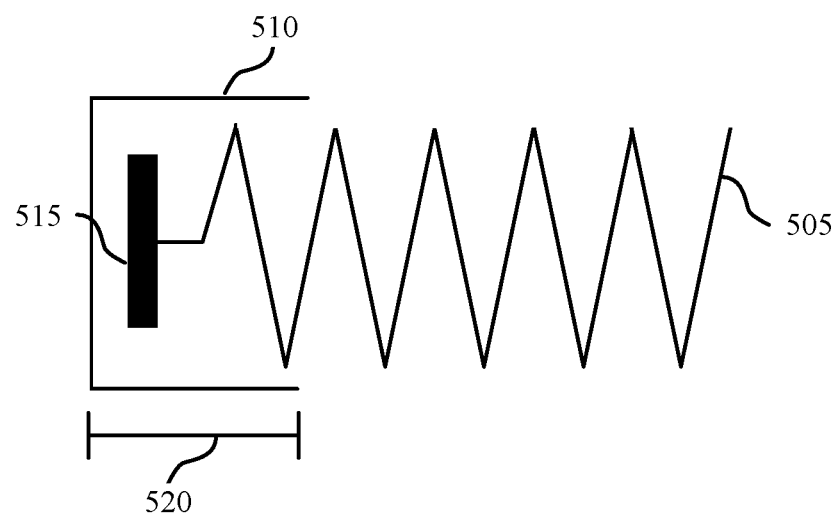
FIG. 5 illustrates an example of an electrical shield that supports the NULEF-E transducer design in accordance with one or more aspects of the present disclosure.

FIG. 5 illustrates an example of an electrical shield 500 that supports the NULEF-E transducer design in accordance with one or more aspects of the present disclosure. The secondary electrode 515 may be connected to a receiver by a secondary wire coil 505. The received voltage may be maximized by shielding the secondary electrode 515 from the electric field present on the human body that may extend through space from the body. If both the primary and the secondary electrodes have the same electric field then there may not be a received potential difference in the gain. Shielding the body's electric field from the secondary electrode 515 may therefore increase transducer efficiency. In some implementations, the shield 510 may be a metal cylindrical conductive shield. In some cases, the length of the shield 520 may be extended to cover the turns of the secondary wire coil 505 for increased performance. Thus, the length of the cylindrical shield may cover the secondary electrode 515 and at least a portion of the secondary wire coil 505 electrically connecting the transceiver and the secondary electrode 515.

Figure 6:
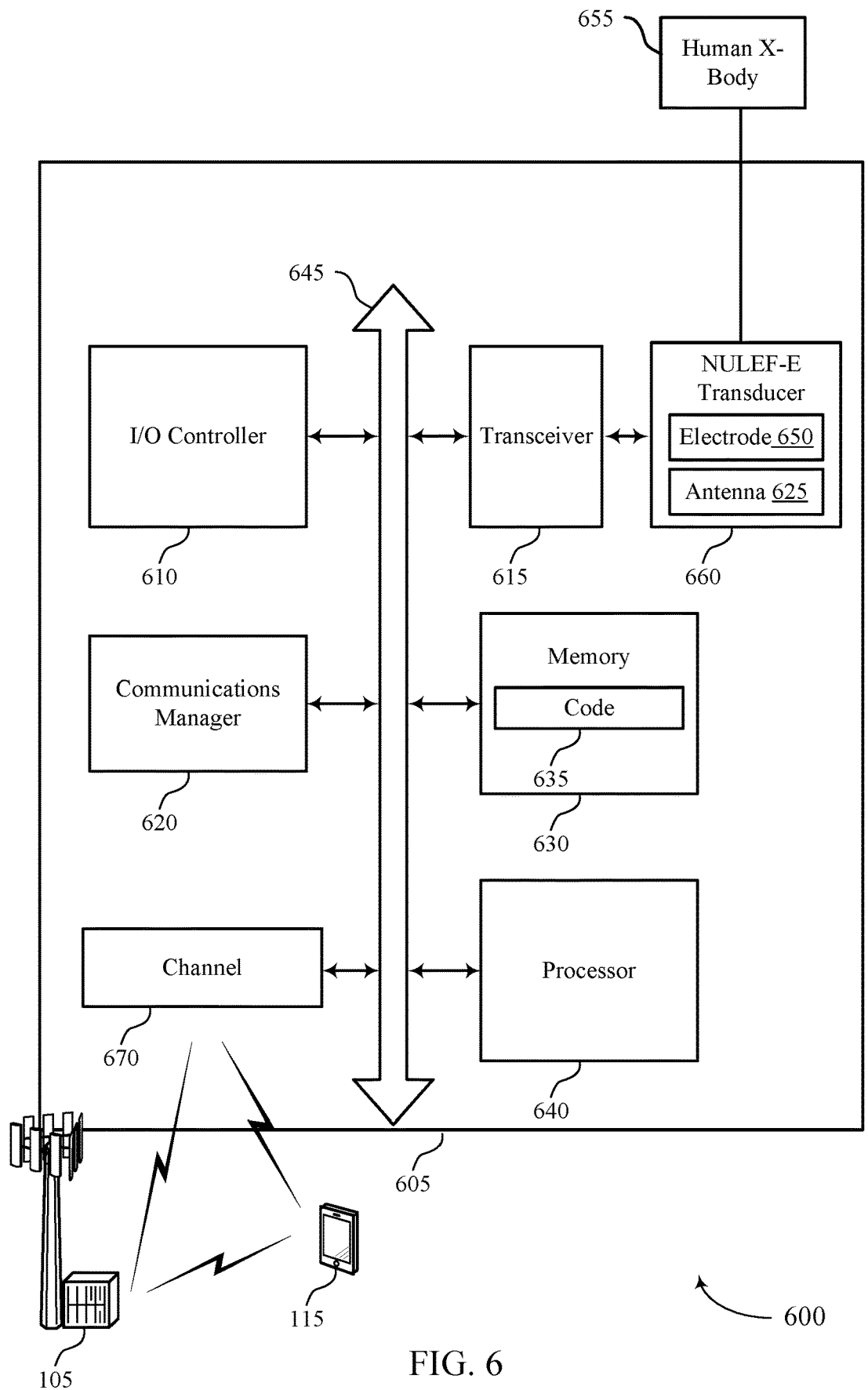
FIG. 6 shows a diagram of a system including a device that supports the NULEF-E transducer design in accordance with one or more aspects of the present disclosure.

FIG. 6 shows a diagram of a system 600 including a device 605 that supports the NULEF-E transducer design in accordance with one or more aspects of the present disclosure. The device 605 may be an example of a UE 715 which may be an earbud as described herein. The device 605 may use a wireless communications system as described in FIG. 7 to receive signals. The device 605 may communicate (e.g., wirelessly) with one or more network entities 705, one or more UEs 715, or any combination thereof. The device 605 may include components for bi-directional voice and data communications including components for transmitting and receiving communications, such as a communications manager 620, an input/output (I/O) controller 610, a transceiver 615, an NULEF-E transducer 660, a memory 630, code 635, a processor 640, and a channel 670. The NULEF-E transducer 660 may include an electrode 650 and one or more antennas 625. These components may be in electronic communication or otherwise coupled (e.g., operatively, communicatively, functionally, electronically, electrically) via one or more buses (e.g., a bus 645).

The I/O controller 610 may manage input and output signals for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. Additionally or alternatively, the I/O controller 610 may represent or interact with a modem, a keyboard, a mouse, a touchscreen, or a similar device. In some cases, the I/O controller 610 may be implemented as part of a processor, such as the processor 640. In some cases, a user may interact with the device 605 via the I/O controller 610 or via hardware components controlled by the I/O controller 610.

In some cases, the device 605 may include a single NULEF-E transducer 660. However, in some other cases, the device 605 may have more than one NULEF-E transducer 660, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 may also include a modem to modulate the packets, to provide the modulated packets to one or more antennas 625 for transmission, and to demodulate packets received from the one or more antennas 625. The transceiver 615, or the transceiver 615 and one or more antennas 625, may be an example of a transmitter, a receiver, or any combination thereof or component thereof, as described herein. FIG. 6 depicts two types of channels. The first channel 670 may include an electromagnetic channel via an antenna, which may be used, for example, in 5G or WiFi. The second channel may be created by the human X-body 655 via the NULEF-E system transducer 660. In some cases, the communications may include the human X-body 655 communications without any external electromagnetic channel 670. Additionally, it is to be noted that the electrode assembly in transmitter mode from the voltage to E-field (V2E) transducer and on the receiver of the electrode assembly may become an E-field to voltage (E2V) transducer.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some cases, the code 635 may not be directly executable by the processor 640 but may cause a computer (e.g., when compiled and executed) to perform functions described herein. In some cases, the memory 630 may contain, among other things, a basic I/O system (BIOS) which may control basic hardware or software operation such as the interaction with peripheral components or devices.

The processor 640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In some other cases, a memory controller may be integrated into the processor 640. The processor 640 may be configured to execute computer-readable instructions stored in a memory (e.g., the memory 630) to cause the device 605 to perform various functions (e.g., functions or tasks supporting the NULEF-E transducer design). For example, the device 605 or a component of the device 605 may include a processor 640 and memory 630 coupled with or to the processor 640, the processor 640 and memory 630 configured to perform various functions described herein.

Additionally, or alternatively, the communications manager 620 may support performing near field communications in accordance with examples as disclosed herein. For example, the communications manager 620 may be configured as or otherwise support a means for electrically connecting a transceiver and an electrode via a wire, the wire having a wire length that is also an electrical length between the transceiver and the electrode, the wire being configured such that a physical distance between the electrode and the transceiver is less than the wire length while maintaining the electrical length.

By including or configuring the communications manager 620 in accordance with examples as described herein, the device 605 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 620 may be configured to perform various operations (e.g., receiving, monitoring, transmitting) using or otherwise in cooperation with the transceiver 615, the one or more antennas 625, or any combination thereof. Although the communications manager 620 is illustrated as a separate component, in some examples, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of the NULEF-E transducer design as described herein, or the processor 640 and the memory 630 may be otherwise configured to perform or support such operations.

As described herein and in some cases, device 605 may be an earbud. The communications manager 620, or various components thereof, may be an example of means for performing various aspects of the NULEF-E transducer design as described herein. For example, the communications manager 620 may be in communication with an electrode 650. The transceiver 615 and the electrode 650 may be electrically coupled with a wire. The electrode 650 may be enclosed in a conductive shield. Each of these components may communicate, directly or indirectly, with one another (e.g., via one or more buses).

Additionally, or alternatively, the device 605 may support performing near field communications in accordance with examples as disclosed herein. The device 605 may be configured as or otherwise support a means for electrically connecting a transceiver 615 and an electrode 650 via a wire, the wire having a wire length that is also an electrical length between the transceiver 615 and the electrode 650, the wire being configured such that a physical distance between the electrode 650 and the transceiver 615 is less than the wire length while maintaining the electrical length.

In some examples, the wire is connected between the transceiver 615 and the electrode 650 using a set of multiple turns in accordance with an orientation pattern that maintains the electrical length.

In some examples, the orientation pattern includes the wire being wound in a clockwise orientation during a first turn of the set of multiple turns followed by a counter-clockwise orientation during a second turn of the set of multiple turns. In some examples, the first turn of the set of multiple turns and the second turn of the set of multiple turns are consecutive turns.

In some examples, each turn of the set of multiple turns includes the wire being wound in a spiral. In some examples, the conductive shield includes a cylindrical shield. In some examples, a length of the cylindrical shield covers the electrode 650.

In some examples, the conductive shield includes a cylindrical shield. In some examples, a length of the cylindrical shield covers the electrode 650 and at least a portion of the wire electrically connecting the transceiver 615 and the electrode 650. In some examples, the conductive shield includes a metal shield.

In some examples, the electrical length of wire is selected based on a desired range of difference in potential at the transceiver 615. In some examples, the electrode 650 is capacitively coupled to a human body. In some examples, the electrode 650 is directly coupled to a human body.

Figure 7:
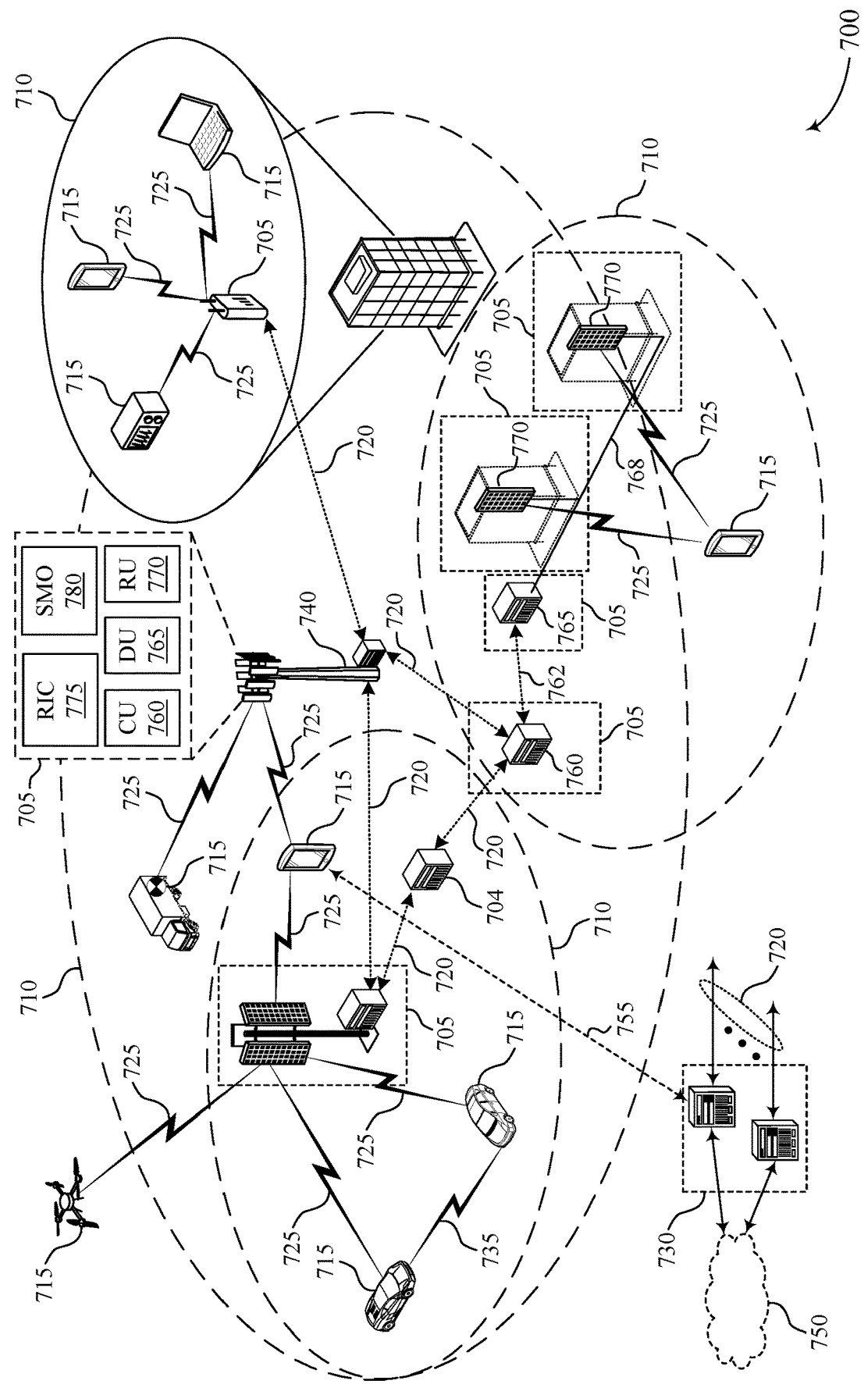
FIG. 7 illustrates an example of a wireless communications system that supports the NULEF-E transducer design in accordance with one or more aspects of the present disclosure.

FIG. 7 illustrates an example of a wireless communications system 700 that supports the NULEF-E transducer design in accordance with one or more aspects of the present disclosure. The wireless communications system 700 may include one or more network entities 705, one or more UEs 715, and a core network 730. In some examples, the wireless communications system 700 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 705 may be dispersed throughout a geographic area to form the wireless communications system 700 and may include devices in different forms or having different capabilities. In various examples, a network entity 705 may be referred to as a network element, a mobility element, a radio access network (RAN) node, or network equipment, among other nomenclature. In some examples, network entities 705 and UEs 715 may wirelessly communicate via one or more communication links 725 (e.g., a radio frequency (RF) access link). For example, a network entity 705 may support a coverage area 710 (e.g., a geographic coverage area) over which the UEs 715 and the network entity 705 may establish one or more communication links 725. The coverage area 710 may be an example of a geographic area over which a network entity 705 and a UE 715 may support the communication of signals according to one or more radio access technologies (RATs).

The UEs 715 may be dispersed throughout a coverage area 710 of the wireless communications system 700, and each UE 715 may be stationary, or mobile, or both at different times. The UEs 715 may be devices in different forms or having different capabilities. Some example UEs 715 are illustrated in FIG. 7. The UEs 715 described herein may be able to communicate with various types of devices, such as other UEs 715 or network entities 705, as shown in FIG. 7.

As described herein, a node of the wireless communications system 700, which may be referred to as a network node, or a wireless node, may be a network entity 705 (e.g., any network entity described herein), a UE 715 (e.g., any UE described herein), a network controller, an apparatus, a device, a computing system, one or more components, or another suitable processing entity configured to perform any of the techniques described herein. For example, a node may be a UE 715. As another example, a node may be a network entity 705. As another example, a first node may be configured to communicate with a second node or a third node. In one aspect of this example, the first node may be a UE 715, the second node may be a network entity 705, and the third node may be a UE 715. In another aspect of this example, the first node may be a UE 715, the second node may be a network entity 705, and the third node may be a network entity 705. In yet other aspects of this example, the first, second, and third nodes may be different relative to these examples. Similarly, reference to a UE 715, network entity 705, apparatus, device, computing system, or the like may include disclosure of the UE 715, network entity 705, apparatus, device, computing system, or the like being a node. For example, disclosure that a UE 715 is configured to receive information from a network entity 705 also discloses that a first node is configured to receive information from a second node.

In some examples, network entities 705 may communicate with the core network 730, or with one another, or both. For example, network entities 705 may communicate with the core network 730 via one or more backhaul communication links 720 (e.g., in accordance with an S1, N2, N3, or other interface protocol). In some examples, network entities 705 may communicate with one another over a backhaul communication link 720 (e.g., in accordance with an X2, Xn, or other interface protocol) either directly (e.g., directly between network entities 705) or indirectly (e.g., via a core network 730). In some examples, network entities 705 may communicate with one another via a midhaul communication link 762 (e.g., in accordance with a midhaul interface protocol) or a fronthaul communication link 768 (e.g., in accordance with a fronthaul interface protocol), or any combination thereof. The backhaul communication links 720, midhaul communication links 762, or fronthaul communication links 768 may be or include one or more wired links (e.g., an electrical link, an optical fiber link), one or more wireless links (e.g., a radio link, a wireless optical link), among other examples or various combinations thereof. A UE 715 may communicate with the core network 730 through a communication link 755.

One or more of the network entities 705 described herein may include or may be referred to as a base station 740 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 705 (e.g., a base station 740) may be implemented in an aggregated (e.g., monolithic, standalone) base station architecture, which may be configured to utilize a protocol stack that is physically or logically integrated within a single network entity 705 (e.g., a single RAN node, such as a base station 740).

In some examples, a network entity 705 may be implemented in a disaggregated architecture (e.g., a disaggregated base station architecture, a disaggregated RAN architecture), which may be configured to utilize a protocol stack that is physically or logically distributed among two or more network entities 705, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 705 may include one or more of a central unit (CU) 760, a distributed unit (DU) 765, a radio unit (RU) 770, a RAN Intelligent Controller (RIC) 775 (e.g., a Near-Real Time RIC (Near-RT RIC), a Non-Real Time RIC (Non-RT RIC)), a Service Management and Orchestration (SMO) 780 system, or any combination thereof. An RU 770 may also be referred to as a radio head, a smart radio head, a remote radio head (RRH), a remote radio unit (RRU), or a transmission reception point (TRP). One or more components of the network entities 705 in a disaggregated RAN architecture may be co-located, or one or more components of the network entities 705 may be located in distributed locations (e.g., separate physical locations). In some examples, one or more network entities 705 of a disaggregated RAN architecture may be implemented as virtual units (e.g., a virtual CU (VCU), a virtual DU (VDU), a virtual RU (VRU)).

The split of functionality between a CU 760, a DU 765, and an RU 775 is flexible and may support different functionalities depending upon which functions (e.g., network layer functions, protocol layer functions, baseband functions, RF functions, and any combinations thereof) are performed at a CU 760, a DU 765, or an RU 775. For example, a functional split of a protocol stack may be employed between a CU 760 and a DU 765 such that the CU 760 may support one or more layers of the protocol stack and the DU 765 may support one or more different layers of the protocol stack. In some examples, the CU 760 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 760 may be connected to one or more DUs 765 or RUs 770, and the one or more DUs 765 or RUs 770 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 760. Additionally, or alternatively, a functional split of the protocol stack may be employed between a DU 765 and an RU 770 such that the DU 765 may support one or more layers of the protocol stack and the RU 770 may support one or more different layers of the protocol stack. The DU 765 may support one or multiple different cells (e.g., via one or more RUs 770). In some cases, a functional split between a CU 760 and a DU 765, or between a DU 765 and an RU 770 may be within a protocol layer (e.g., some functions for a protocol layer may be performed by one of a CU 760, a DU 765, or an RU 770, while other functions of the protocol layer are performed by a different one of the CU 760, the DU 765, or the RU 770). A CU 760 may be functionally split further into CU control plane (CU-CP) and CU user plane (CU-UP) functions. A CU 760 may be connected to one or more DUs 765 via a midhaul communication link 762 (e.g., F1, F1-c, F1-u), and a DU 765 may be connected to one or more RUs 770 via a fronthaul communication link 768 (e.g., open fronthaul (FH) interface). In some examples, a midhaul communication link 762 or a fronthaul communication link 768 may be implemented in accordance with an interface (e.g., a channel) between layers of a protocol stack supported by respective network entities 705 that are in communication over such communication links.

In wireless communications systems (e.g., wireless communications system 700), infrastructure and spectral resources for radio access may support wireless backhaul link capabilities to supplement wired backhaul connections, providing an IAB network architecture (e.g., to a core network 730). In some cases, in an IAB network, one or more network entities 705 (e.g., IAB nodes 704) may be partially controlled by each other. One or more IAB nodes 704 may be referred to as a donor entity or an IAB donor. One or more DUs 765 or one or more RUs 770 may be partially controlled by one or more CUs 760 associated with a donor network entity 705 (e.g., a donor base station 740). The one or more donor network entities 705 (e.g., IAB donors) may be in communication with one or more additional network entities 705 (e.g., IAB nodes 704) via supported access and backhaul links (e.g., backhaul communication links 720). IAB nodes 704 may include an IAB mobile termination (IAB-MT) controlled (e.g., scheduled) by DUs 765 of a coupled IAB donor. An IAB-MT may include an independent set of antennas for relay of communications with UEs 715, or may share the same antennas (e.g., of an RU 770) of an IAB node 704 used for access via the DU 765 of the IAB node 704 (e.g., referred to as virtual IAB-MT (vIAB-MT)). In some examples, the IAB nodes 704 may include DUs 765 that support communication links with additional entities (e.g., IAB nodes 704, UEs 715) within the relay chain or configuration of the access network (e.g., downstream). In such cases, one or more components of the disaggregated RAN architecture (e.g., one or more IAB nodes 704 or components of IAB nodes 704) may be configured to operate according to the techniques described herein.

In the case of the techniques described herein applied in the context of a disaggregated RAN architecture, one or more components of the disaggregated RAN architecture may be configured to support the NULEF-E transducer design as described herein. For example, some operations described as being performed by a UE 715 or a network entity 705 (e.g., a base station 740) may additionally, or alternatively, be performed by one or more components of the disaggregated RAN architecture (e.g., IAB nodes 704, DUs 765, CUs 760, RUs 770, RIC 775, SMO 780).

A UE 715 may include or may be referred to as a mobile device, a wireless device, a remote device, a handheld device, or a subscriber device, or some other suitable terminology, where the "device" may also be referred to as a unit, a station, a terminal, or a client, among other examples. A UE 715 may also include or may be referred to as a personal electronic device such as a cellular phone, a personal digital assistant (PDA), a tablet computer, a laptop computer, or a personal computer. In some examples, a UE 715 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 715 described herein may be able to communicate with various types of devices, such as other UEs 715 that may sometimes act as relays as well as the network entities 705 and the network equipment including macro eNBs or gNBs, small cell eNBs or gNBs, or relay base stations, among other examples, as shown in FIG. 7.

The UEs 715 and the network entities 705 may wirelessly communicate with one another via one or more communication links 725 (e.g., an access link) over one or more carriers. The term "carrier" may refer to a set of RF spectrum resources having a defined physical layer structure for supporting the communication links 725. For example, a carrier used for a communication link 725 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 700 may support communication with a UE 715 using carrier aggregation or multi-carrier operation. A UE 715 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 705 and other devices may refer to communication between the devices and any portion (e.g., entity, sub-entity) of a network entity 705. For example, the terms "transmitting," "receiving," or "communicating," when referring to a network entity 705, may refer to any portion of a network entity 705 (e.g., a base station 740, a CU 760, a DU 765, a RU 770) of a RAN communicating with another device (e.g., directly or via one or more other network entities 705).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 715.

The time intervals for the network entities 705 or the UEs 715 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 700, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 700 and may be referred to as a transmission time interval (TTI). In some examples, the TTI duration (e.g., a quantity of symbol periods in a TTI) may be variable. Additionally, or alternatively, the smallest scheduling unit of the wireless communications system 700 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 715. For example, one or more of the UEs 715 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 715 and UE-specific search space sets for sending control information to a specific UE 715.

In some examples, a network entity 705 (e.g., a base station 740, an RU 770) may be movable and therefore provide communication coverage for a moving coverage area 710. In some examples, different coverage areas 710 associated with different technologies may overlap, but the different coverage areas 710 may be supported by the same network entity 705. In some other examples, the overlapping coverage areas 710 associated with different technologies may be supported by different network entities 705. The wireless communications system 700 may include, for example, a heterogeneous network in which different types of the network entities 705 provide coverage for various coverage areas 710 using the same or different radio access technologies.

The wireless communications system 700 may be configured to support ultra-reliable communications or low-latency communications, or various combinations thereof. For example, the wireless communications system 700 may be configured to support ultra-reliable low-latency communications (URLLC). The UEs 715 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 715 may be able to communicate directly with other UEs 715 over a device-to-device (D2D) communication link 735 (e.g., in accordance with a peer-to-peer (P2P), D2D, or sidelink protocol). In some examples, one or more UEs 715 of a group that are performing D2D communications may be within the coverage area 710 of a network entity 705 (e.g., a base station 740, an RU 770), which may support aspects of such D2D communications being configured by or scheduled by the network entity 705. In some examples, one or more UEs 715 in such a group may be outside the coverage area 710 of a network entity 705 or may be otherwise unable to or not configured to receive transmissions from a network entity 705. In some examples, groups of the UEs 715 communicating via D2D communications may support a one-to-many (1:M) system in which each UE 715 transmits to each of the other UEs 715 in the group. In some examples, a network entity 705 may facilitate the scheduling of resources for D2D communications. In some other examples, D2D communications may be carried out between the UEs 715 without the involvement of a network entity 705.

The core network 730 may provide user authentication, access authorization, tracking, Internet Protocol (IP) connectivity, and other access, routing, or mobility functions. The core network 730 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 715 served by the network entities 705 (e.g., base stations 740) associated with the core network 730. User IP packets may be transferred through the user plane entity, which may provide IP address allocation as well as other functions. The user plane entity may be connected to IP services 750 for one or more network operators. The IP services 750 may include access to the Internet, Intranet(s), an IP Multimedia Subsystem (IMS), or a Packet-Switched Streaming Service.

The wireless communications system 700 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 715 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 700 may utilize both licensed and unlicensed RF spectrum bands. For example, the wireless communications system 700 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 705 and the UEs 715 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 705 (e.g., a base station 740, an RU 770) or a UE 715 may be equipped with multiple antennas, which may be used to employ techniques such as transmit diversity, receive diversity, multiple-input multiple-output (MIMO) communications, or beamforming. The antennas of a network entity 705 or a UE 715 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 705 may be located in diverse geographic locations. A network entity 705 may have an antenna array with a set of rows and columns of antenna ports that the network entity 705 may use to support beamforming of communications with a UE 715. Likewise, a UE 715 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 705, a UE 715) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, the UE 715 may include an earbud and may include an electrode and a transceiver. The UE 715 may support means for electrically connecting a transceiver and an electrode via a wire. In some examples, the wire may have a wire length that is also an electrical length between the transceiver and the electrode, the wire being configured such that a physical distance between the electrode and the transceiver is less than the wire length while maintaining the electrical length. In some examples, the wire may be connected between the transceiver and the electrode using a set of multiple turns in accordance with an orientation pattern that maintains the electrical length.

The following provides an overview of aspects of the present disclosure:

Aspect 1: An apparatus for performing near field communications, comprising: an electrode; a transceiver; and a wire electrically connecting the transceiver and the electrode, the wire having a wire length that is also an electrical length between the transceiver and the electrode, the wire being configured such that a physical distance between the electrode and the transceiver is less than the wire length while maintaining the electrical length.

Aspect 2: The apparatus of aspect 1, wherein the wire is connected between the transceiver and the electrode using a plurality of turns in accordance with an orientation pattern that maintains the electrical length.

Aspect 3: The apparatus of aspect 2, wherein the orientation pattern includes the wire being wound in a clockwise orientation during a first turn of the plurality of turns followed by a counter-clockwise orientation during a second turn of the plurality of turns.

Aspect 4: The apparatus of aspect 3, wherein the first turn of the plurality of turns and the second turn of the plurality of turns are consecutive turns.

Aspect 5: The apparatus of any of aspects 2 through 4, wherein each turn of the plurality of turns comprises the wire being wound in a spiral.

Aspect 6: The apparatus of any of aspects 1 through 5, further comprising a conductive shield between the electrode and a physical medium coupled with the electrode.

Aspect 7: The apparatus of aspect 6, wherein the conductive shield comprises a cylindrical shield, and a length of the cylindrical shield covers the electrode.

Aspect 8: The apparatus of any of aspects 6 through 7, wherein the conductive shield comprises a cylindrical shield, and a length of the cylindrical shield covers the electrode and at least a portion of the wire electrically connecting the transceiver and the electrode.

Aspect 9: The apparatus of any of aspects 6 through 8, wherein the conductive shield comprises a metal shield.

Aspect 10: The apparatus of any of aspects 1 through 9, wherein the electrical length of wire is selected based at least in part on a desired range of difference in potential at the transceiver.

Aspect 11: The apparatus of any of aspects 1 through 10, wherein the electrode is capacitively coupled to a human body.

Aspect 12: The apparatus of any of aspects 1 through 11, wherein the electrode is directly coupled to a human body.

Aspect 13: An apparatus comprising a processor; memory coupled with the processor; and instructions stored in the memory and executable by the processor to cause the apparatus to perform a method of any of aspects 1 through 12.

Aspect 14: An apparatus comprising at least one means for performing a method of any of aspects 1 through 12.

Aspect 15: A non-transitory computer-readable medium storing code the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a processor;
   memory coupled with the processor; and
   instructions stored in the memory and executable by the processor to cause the apparatus to:
   an electrode;
   a transceiver;
   a wire electrically connect the transceiver and the electrode, the wire having a wire length that is also an electrical length between the transceiver and the electrode, the wire being configured such that a physical distance between the electrode and the transceiver is less than the wire length while maintaining the electrical length;
   wherein the wire is connected between the transceiver and the electrode using a plurality of turns in accordance with an orientation pattern that maintains the electrical length; and
   wherein the orientation pattern includes the wire being wound in a clockwise orientation during a first turn of the plurality of turns followed by a counter-clockwise orientation during a second turn of the plurality of turns.

2. The apparatus of claim 1, wherein the first turn of the plurality of turns and the second turn of the plurality of turns are consecutive turns.

3. The apparatus of claim 1, wherein each turn of the plurality of turns comprises the wire being wound in a spiral.

4. The apparatus of claim 1, further comprising a conductive shield between the electrode and a physical medium coupled with the electrode.

5. The apparatus of claim 4, wherein the conductive shield comprises a cylindrical shield, and a length of the cylindrical shield covers the electrode.

6. The apparatus of claim 4, wherein the conductive shield comprises a cylindrical shield, and a length of the cylindrical shield covers the electrode and at least a portion of the wire electrically connecting the transceiver and the electrode.

7. The apparatus of claim 4, wherein the conductive shield comprises a metal shield.

8. The apparatus of claim 1, wherein the electrical length of wire is selected based at least in part on a desired range of difference in potential at the transceiver.

9. The apparatus of claim 1, wherein the electrode is capacitively coupled to a human body.

10. The apparatus of claim 1, wherein the electrode is directly coupled to a human body.

11. A method for performing near field communications, comprising:
electrically connecting a transceiver and an electrode via a wire, the wire having a wire length that is also an electrical length between the transceiver and the electrode, the wire being configured such that a physical distance between the electrode and the transceiver is less than the wire length while maintaining the electrical length;
wherein the wire is connected between the transceiver and the electrode using a plurality of turns in accordance with an orientation pattern that maintains the electrical length; and
wherein the orientation pattern includes the wire being wound in a clockwise orientation during a first turn of the plurality of turns followed by a counter-clockwise orientation during a second turn of the plurality of turns.

12. The method of claim 11, wherein the first turn of the plurality of turns and the second turn of the plurality of turns are consecutive turns.

13. The method of claim 11, wherein each turn of the plurality of turns comprises the wire being wound in a spiral.

14. The method of claim 11, further comprising a conductive shield between the electrode and a physical medium coupled with the electrode.

15. The method of claim 14, wherein the conductive shield comprises a cylindrical shield, and a length of the cylindrical shield covers the electrode.

16. The method of claim 14, wherein the conductive shield comprises a cylindrical shield, and a length of the cylindrical shield covers the electrode and at least a portion of the wire electrically connecting the transceiver and the electrode.

17. The method of claim 14, wherein the conductive shield comprises a metal shield.

18. The method of claim 11, wherein the electrode is capacitively coupled to a human body.

19. The method of claim 11, wherein the electrode is directly coupled to a human body.

20. A method for performing near field communications, comprising:
electrically connecting a transceiver and an electrode via a wire, the wire having a wire length that is also an electrical length between the transceiver and the electrode, the wire being configured such that a physical distance between the electrode and the transceiver is less than the wire length while maintaining the electrical length; and
wherein the electrical length of wire is selected based at least in part on a desired range of difference in potential at the transceiver.

21. An apparatus, comprising:
an electrode;
a transceiver;
means for electrically connecting a transceiver and an electrode via a wire, the wire having a wire length that is also an electrical length between the transceiver and the electrode, the wire being configured such that a physical distance between the electrode and the transceiver is less than the wire length while maintaining the electrical length;
wherein the wire is connected between the transceiver and the electrode using a plurality of turns in accordance with an orientation pattern that maintains the electrical length; and
wherein the orientation pattern includes the wire being wound in a clockwise orientation during a first turn of the plurality of turns followed by a counter-clockwise orientation during a second turn of the plurality of turns.

22. The apparatus of claim 21, wherein:
the first turn of the plurality of turns and the second turn of the plurality of turns are consecutive turns.

23. The apparatus of claim 21, wherein each turn of the plurality of turns comprises the wire being wound in a spiral.

24. A non-transitory computer-readable medium storing code, comprising:
an electrode;
a transceiver;
the code comprising instructions executable by a processor to:
electrically connect a transceiver and an electrode via a wire, the wire having a wire length that is also an electrical length between the transceiver and the electrode, the wire being configured such that a physical distance between the electrode and the transceiver is less than the wire length while maintaining the electrical length;
wherein the wire is connected between the transceiver and the electrode using a plurality of turns in accordance with an orientation pattern that maintains the electrical length; and
wherein the orientation pattern includes the wire being wound in a clockwise orientation during a first turn of the plurality of turns followed by a counter-clockwise orientation during a second turn of the plurality of turns.

* * * * *